United States Patent [19]
Hamada et al.

[11] Patent Number: 4,708,582
[45] Date of Patent: Nov. 24, 1987

[54] METHOD FOR FEEDING A WORK

[75] Inventors: Shuji Hamada, Yokohama; Akira Yamamoto, Tokyo, both of Japan

[73] Assignee: Niigata Engineering Co., Ltd., Tokyo, Japan

[21] Appl. No.: 910,520

[22] Filed: Sep. 23, 1986

[30] Foreign Application Priority Data

Sep. 24, 1985 [JP] Japan .................. 60-210468
Nov. 22, 1985 [JP] Japan .................. 60-263147

[51] Int. Cl.$^4$ .......................... B65G 47/24
[52] U.S. Cl. ...................... 414/786; 29/559; 269/37; 198/428; 198/617; 414/225; 414/416; 414/737; 414/783
[58] Field of Search ............ 29/559; 269/56, 37, 269/57; 198/428, 617; 414/786, 737, 225, 783, 416

[56] References Cited
U.S. PATENT DOCUMENTS

| 2,806,528 | 9/1957 | Slaughter | 269/56 X |
| 2,808,746 | 10/1957 | Blomquist | 269/56 |
| 3,323,630 | 6/1967 | Fowler et al. | 269/56 X |
| 4,062,462 | 12/1977 | Hentz et al. | 414/786 |
| 4,162,018 | 7/1979 | Arya | 414/786 |
| 4,200,182 | 4/1980 | Siarto | 414/786 X |
| 4,204,610 | 5/1980 | Schlaepfer | 414/786 X |
| 4,278,377 | 7/1981 | Elineau | 414/786 X |
| 4,343,585 | 8/1982 | Tedeschi | 414/786 X |
| 4,373,840 | 2/1983 | Miller, Jr. | 414/786 X |
| 4,557,655 | 12/1985 | Berg | 414/786 X |

Primary Examiner—Charlie T. Moon
Attorney, Agent, or Firm—Kane, Dalsimer, Kane, Sullivan and Kurucz

[57] ABSTRACT

A method of feeding a work, in which a jig having an attitude controlling groove formed therein is prepared. A first work is controlled to assume a predetermined attitude by placing the work in the attitude controlling groove. The jig is conveyed to a first position so that the attitude controlling groove is located at a second position. Then, the first work is moved to a third position in the controlling groove and the first work at the third position is transferred to a processing device.

4 Claims, 13 Drawing Figures

METHOD FOR FEEDING A WORK

BACKGROUND OF THE INVENTION

The present invention relates to a method of feeding a work in a predetermined attitude or three dimensional position to a processing apparatus such as a machine tool.

In such a method according to the prior art, works are taken out one by one from a pallet, on which they are placed, and then passed to an attitude controlling device fixed to a predetermined position, where they are controlled to take a predetermined attitude and then fed to a machine tool. This prior art method is disadvantageous in that it is time consuming.

SUMMARY OF THE INVENTION

Accordingly, it is an object of the present invention to provide a method for feeding a work, in which the work is feed in a predetermined attitude to a processing device in a less time consuming manner.

With this and other object in view, the present invention provides a method of feeding a work, in which a jig having an attitude controlling groove formed therein is prepared. A first- work is controlled to assume a predetermined attitude by placing the work in the attitude controlling groove. The jig is conveyed to a first position so that the attitude controlling groove is located at a second position. Then, the first work is moved to a third position in the controlling groove and the first work at the third position is transferred to a processing device.

DETAILED DESCRIPTION OF THE INVENTION

Figure 1:
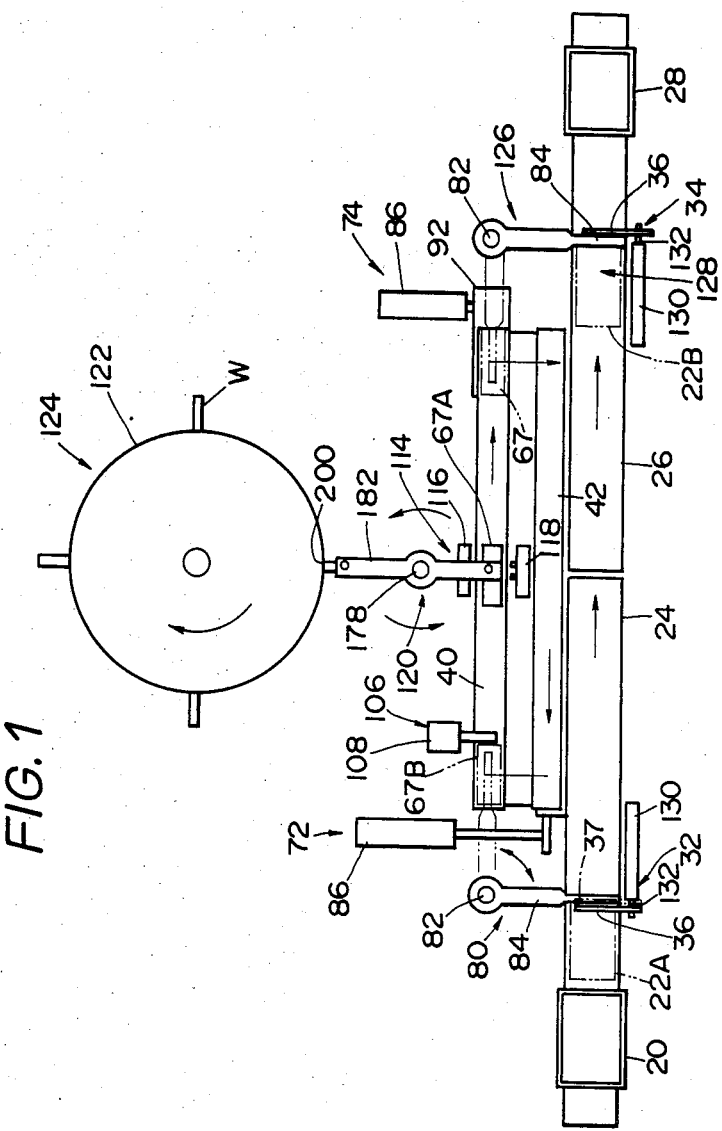
FIG. 1 is a diagrammatic plan view of a work feeding apparatus according to the present invention.
Figure 2:
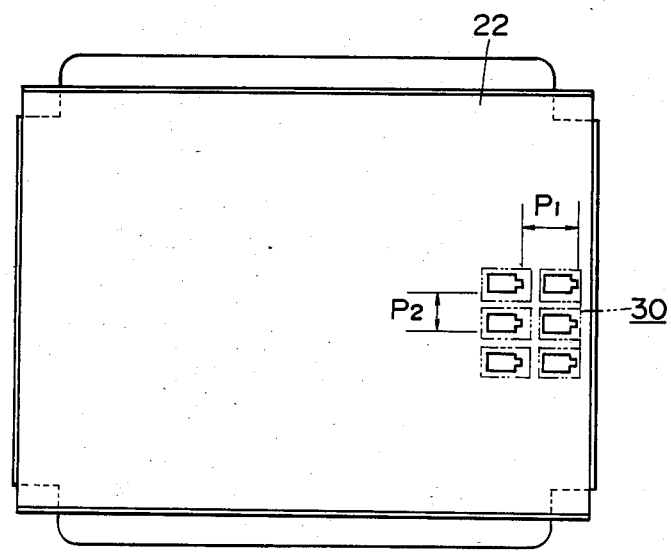
FIG. 2 an enlarged plan view of each pallet in FIG. 1.
Figure 3:
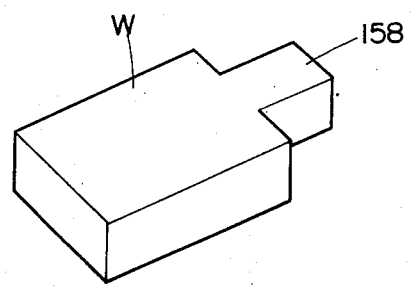
FIG. 3 is an enlarged perspective view of each work in FIG. 1.

FIG. 1 illustrates a work feeding apparatus according to the present invention, in which reference numeral 20 designates a first pallet magazine of a conventional type, in which a plurality of pallets 22 are vertically stacked and from bottom of which pallets 22 are subsequently placed on a first pallet belt conveyor 24 and then conveyed rightwise in FIG. 1 to a second pallet belt conveyor 26, which carries it to a second pallet magazine 28 of the same type as the first pallet magazine 20. Each pallet 22 is, as illustrated in FIG. 2, provided with a plurality of work receiving recesses 30, . . . disposed in columns and rows, each of the columns and rows including ten recesses 30 although only six recesses are illustrated. Each recess 30 is designed to receive a work W in it. Works W are placed in recesses 30 with a pitch $P_1$ in the row direction and a pitch $P_2$ in the column irection. The first and second pallet conveyors 24 and 6 have first and second work column detecting device 32 and 34 disposed adjacent to them, respectively. The first and second work column detecting devices 32 and 34 allow the pallets 22, located below their detecting arms 36 and 38, to intermittently move the pitch P1 of the works W.

Figure 7:
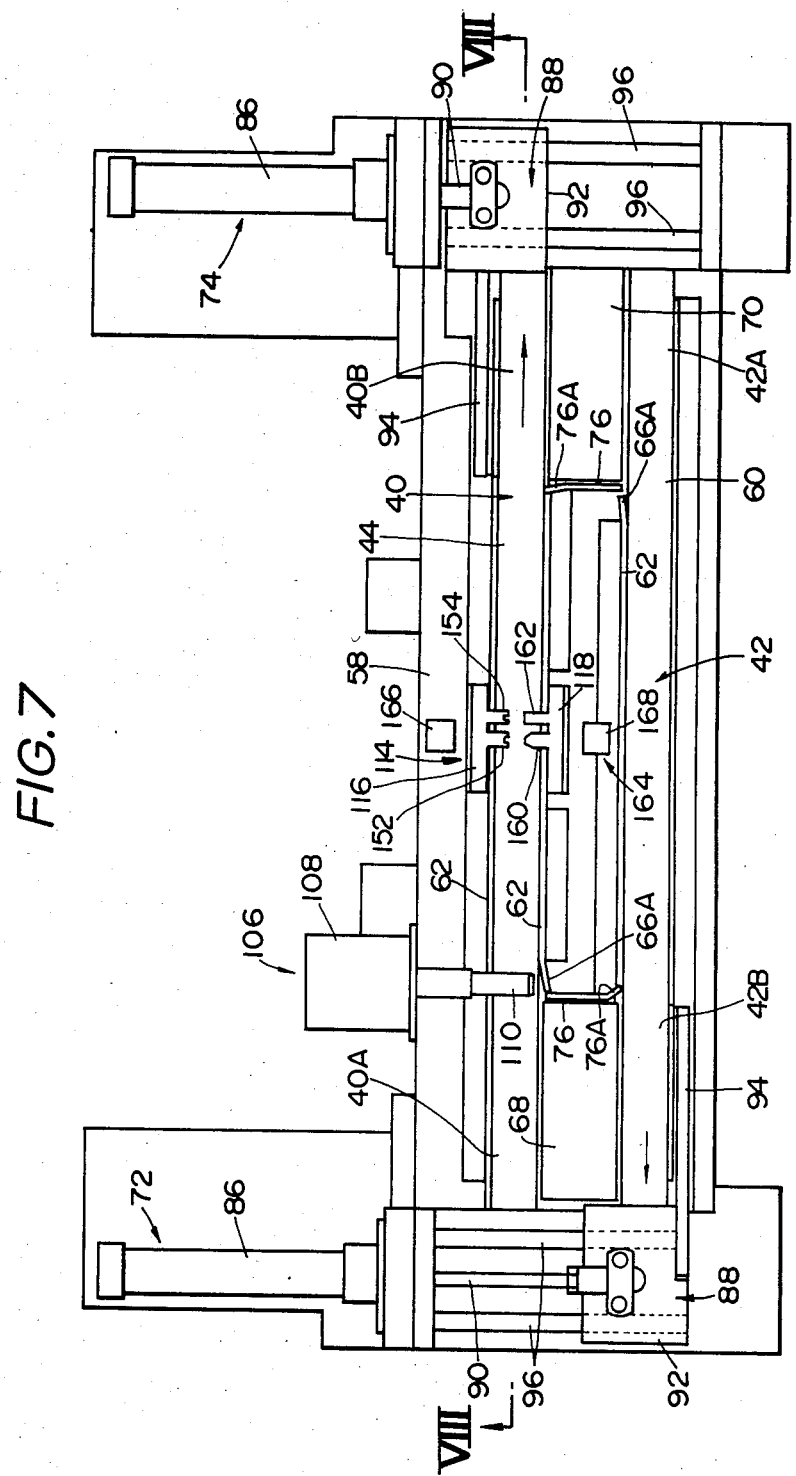
FIG. 7 is an enlarged plan view of the essential portion of the present invention in FIG. 1.
Figure 8:
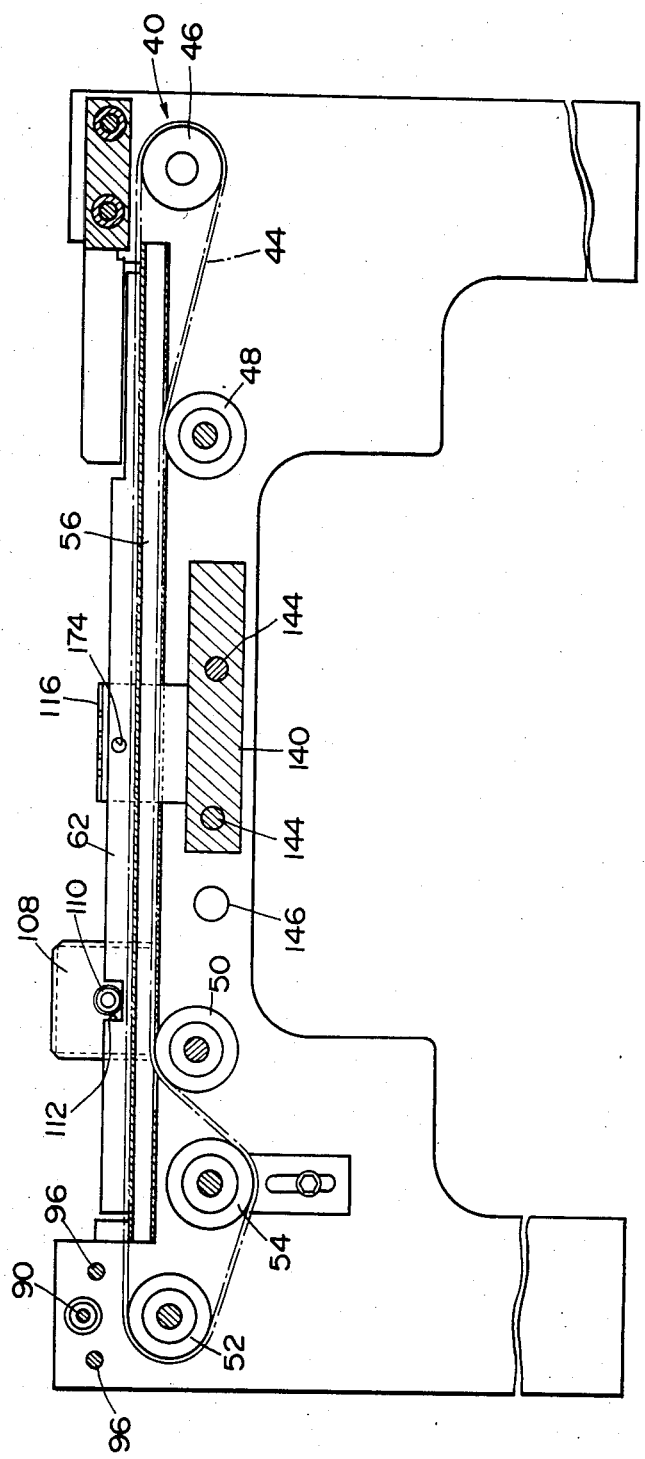
FIG. 8 is a view taken along the line VIII—VIII in FIG. 7.
Figure 10:
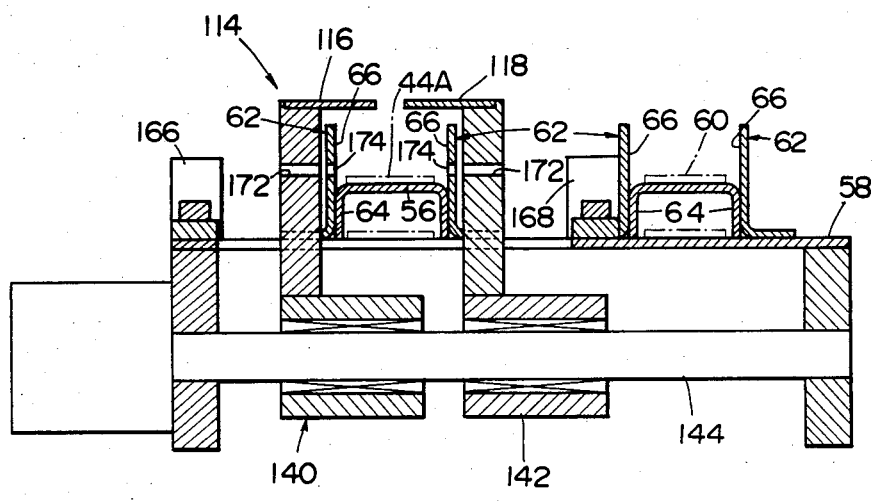
FIG. 10 is a view taken along the line X—X in FIG. 9.
Figure 11:
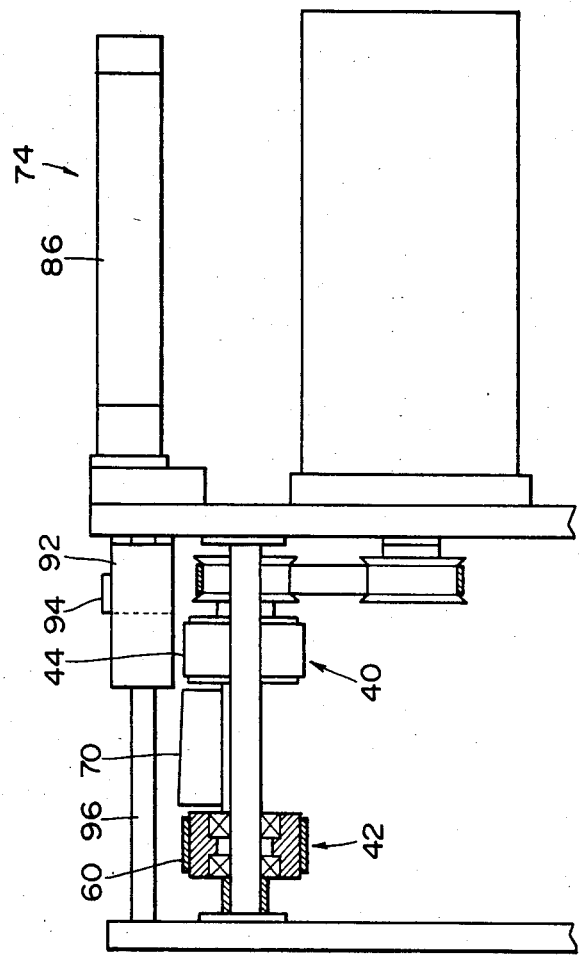
FIG. 11 is an enlarged front view of the feeding conveyor, the returning conveyor and the second transversely moving device in FIG. 1.

On one side of the first and second pallet conveyors 24 and 26, there are disposed a .eeding belt conveyor 40 and a returning belt conveyor 42 in a parallel manner. As illustrated in FIG. 8, the endless belt 44 of the feeding belt conveyor 40 extends around a drive pulley 46, idle pulleys 48, 50 and 52 and a tension pulley 54. The upper portion of the endless belt 44A is, as clearly shown in FIG. 10, supported by an inverted U-shaped channel member 56 mounted on a frame 58 along the endless belt 44. Part of the endless belt 44 passes through the channel portion of the channel member 56. The endless belt 60 of the returning belt conveyor 42 has the same driving and supporting mechanisms as the feeding belt conveyor 40. The feeding belt conveyor 40 moves its belt 44 in the same direction as the first and second pallet conveyers 24 and 26 while the returning belt conveyor 42 moves its belt 60 in the reverse direction as indicated by the arrows in FIG. 1. The feeling and returning belt conveyors 40 and 42 have each a pair of annular guide members 62 and 62 screwed to flanges 64 of the channel member 56 to face their guide plate portions 66 and 66 across the endless belt 44 or 60 as shown in FIG. 10. The forward portion 66A of the guide plate portion of each guide member disposed inside is, as shown in FIG. 7, bent inwards so that a jig 67 is guided to an appropriate position on the endless belt 44 or 60.

Between the starting portion 40A of the feeding belt conveyor 40 and the terminal portion 42B of the returning belt conveyor 42 is a rectangular first bridging plate 68, which is inclined to be gradually raised toward the returning belt conveyor 42. On the other hand, there is also disposed a second bridging plate 70 between the terminal portion 40B of the feeding belt conveyor 40 and the starting portion 42A of the returning belt conveyor 42 so that the second bridging plate 70 is inclined to be gradually raised toward the feeding belt conveyor 40. Such inclined bridging plates 68 and 70 facilitate traversing movement of jigs 67 by first and second transversely moving devices 72 and 74 which will be described hereinafter. Disposed on the inside of each of the first and second bridging plates 68 and 70 is a guide plate 76 for guiding jigs 67 on the bridging plate 68 or 70. Each guide plate 76 is bent inward at its forward end 76A for appropriately guiding jigs 67.

Disposed near starting portions of the first pallet conveyor 24 and the feeding belt conveyor 40 is a first handling device 80 including a conventional cam mechanism (not shown) for carrying ten works W of one column on a pallet 22 to a jig 67 located on the starting portion 40A of the feeding belt conveyor 40. The first handling device 80 includes a vertical rotation shaft 82, designed to turn 90° and to move vertically by the cam mechanism, and a holding arm 84 horizontally mounted at its proximal end to the rotation shaft 82, the holding arm 84 having a vacuum suction head (not shown) mounted to its distal end for holding one column of works W by vacuum. The holding arm 84 holds one column of works by the suction head at a suction position shown by the solid line in FIG. 1, raised and then rotated 90° to a jig position, shown by the phantom line, above the jig 67 located at the starting portion 40A of the feeding belt conveyor 40, at which position it is lowered and then drops the works held to insert them into respective attitude controlling grooves 87 of the jig 67.

A first transversely moving device 72 is disposed near the start portion 40A of the feeding belt conveyor 40 for transversely moving a jig 67 which is located at the terminal portion 42B of the returning belt conveyor 42 to the start portion 40A of the feeding belt conveyor 40 and a second transversely moving device 74 near the terminal portion 40B of the feeding belt conveyor 40 for transversely moving a jig 67, which is located at the terminal portion 40B, to the starting portion 42A of the returning belt conveyor 42. As clearly shown in FIG. 7, each of the transversely moving devices 72, 74 includes an air cylinder 86 mounted on frame 58 and a generally L-shaped stopping and moving member 88 attached to the rod 90 of the air cylinder 86. Each air cylinder 86 is disposed so that the stroke of its rod 90 is perpendicular to the movements of the belts of the feeding and returning belt conveyors 40 and 42. The L-shaped member 88 has a stopping block 92 and a pulling plate 94 integrally formed with the stopping block 92 at right angle and is mounted to the rod 90 so that the pulling plate 94 is disposed parallel to the belts of the feeding and the returning conveyors 40 and 42, and so that the stopping block 92 stops a jig, conveyed by the feeding belt conveyor 40 or the returning belt conveyor 42, with the inner face thereof. Each of the first and second transversely moving devices 72 and 74 further has a pair of parallel guide rods 96 mounted to the frame 58 to be perpendicular to the moving directions of the endless belts 44 and 60 and passing through a corresponding stopping block 92 so that the stopping block 92 may be slidably moved.

Figure 4:
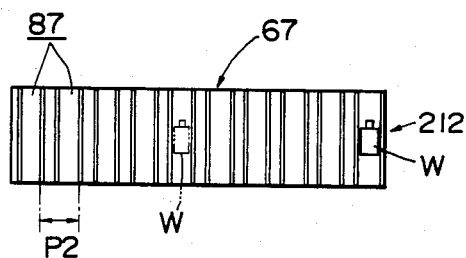
FIG. 4 is an enlarged plan view of each jig in FIG. 1.
Figure 5:
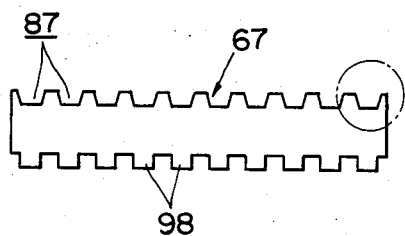
FIG. 5 is a side view of the jig in FIG. 4.
Figure 6:
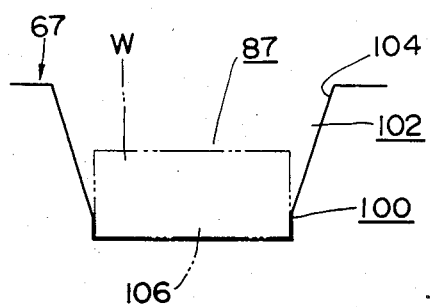
FIG. 6 is an enlarged view of the encircled portion in FIG. 5.

As illustrated in FIG. 4, each jig 67 has a plurality of, ten in this embodiment, attitude controlling grooves 87 formed in its top face at intervals of $P_2$ to be parallel to each other and a plurality of ridges 98 formed in its bottom face to correspond to respective attitude controlling grooves 87. Each of the attitude controlling grooves 87 serves to control a work W received in it to take a predetermined attitude or three dimensional position with respect to it. The attitude controlling grooves 87 have each a rectangular cross section at its bottom portion 100 and a trapezoidal cross section widening upwards at its upper and intermediate portion 102. The bottom portion 100 has a width substantially equal to the width of the works W but enough for receiving them in it and removing them from it. The width of the opening portion of the grooves 87 is considerably wider than the width of the works W. When a work W is dropped above one of the attitude controlling grooves 87, it is guided by the inclined walls 104 of the groove 67 for gradually changing its attitude and then received in the bottom portion 100 of the groove 87 to assume a predetermined attitude 106 as illustrated by the phantom line in FIG. 6.

Mounted to the frame 58 near the starting portion 40A of the feeding belt conveyor 40 is a retaining device 106 for retaining a jig 67 at the starting portion 40A as shown in FIG. 1. The retaining device 106 includes an air cylinder 108 mounted on the frame 58 and a rod 110 of the air cylinder 108 is adapted to pass through a cutout 112 (FIG. 8) formed in an outer guide plate 62 attached to the frame 58 along the feeding belt conveyor 40.

Mounted to the frame 58 near the central portion of the feeding belt conveyor 40 is a positioning device 114 including a pair of first and second positioning members 116 and 118, which serve to move a work W to a suction position along one attitude controlling groove 87 of the jig 67 located at the central portion of the feeding belt conveyor 40 as shown in FIG. 1.

Adjacent to the positoning device 114, there is disposed a second handling device 120 for transporting works W between the jig, located at the central portion of the feeding belt conveyor 40, and a rotary table 122 of a machining device 124.

A third handling device 126 having the same structure as the first handling device 80 is disposed near the terminal portion 40B of the feeding belt conveyor 40. The third handling device 126 transports one column of processed works from a jig 67, located at the terminal portion 40B of the feeding belt conveyor 40, to a pallet 22 which has been conveyed to a loading position 128 shown by the phantom line in FIG. 1.

Each of the first and second work column detecting devices 32 and 34 includes an air cylinder 130, mounted to the frame 58 near a corresponding pallet conveyor 24 or 26, and a detecting arm 36, mounted on the rod 132 of the air cylinder 130 to project transversely over the pallet conveyor 24 or 26. Each detecting arm 36 has a conventional photo detector (not shown) mounted on its lower face for detecting recesses 87 of a pallet 22 on the corresponding pallet conveyor 24 or 26. When the photo detector of the first work column detecting device 32 detects one recess 87 just below it, it generates a signal representing that one column of works W are positioned at a suction position shown just below the holding arm 84 of the first handling device 80. This signal is sent to a control unit 134 including a central processing unit (not shown). The control unit 134 then deenergizes an electric motor 136 of the first pallet conveyor 24 for stopping the latter and actuates the air cylinder 130 to move the detecting arm 36 to the position shown by the solid line in FIG. 1 not to impinge upon the holding arm 84. In the second work column detecting device 34, the photo detector generates a signal representing that one column of recesses 30 of another pallet 22 are located to a position where one column of works processed are placed on the pallet 22. This signal is also sent to the control unit 134, which then deenergizes an electric motor 138 of the second pallet conveyor 26 for stopping the latter and actuates the air cylinder 130 of the second pallet conveyor 26 to move the detecting arm to a position indicated by the solid line in FIG. 1 to be away from the holding arm 84 of the third handling device 126.

Figure 9:
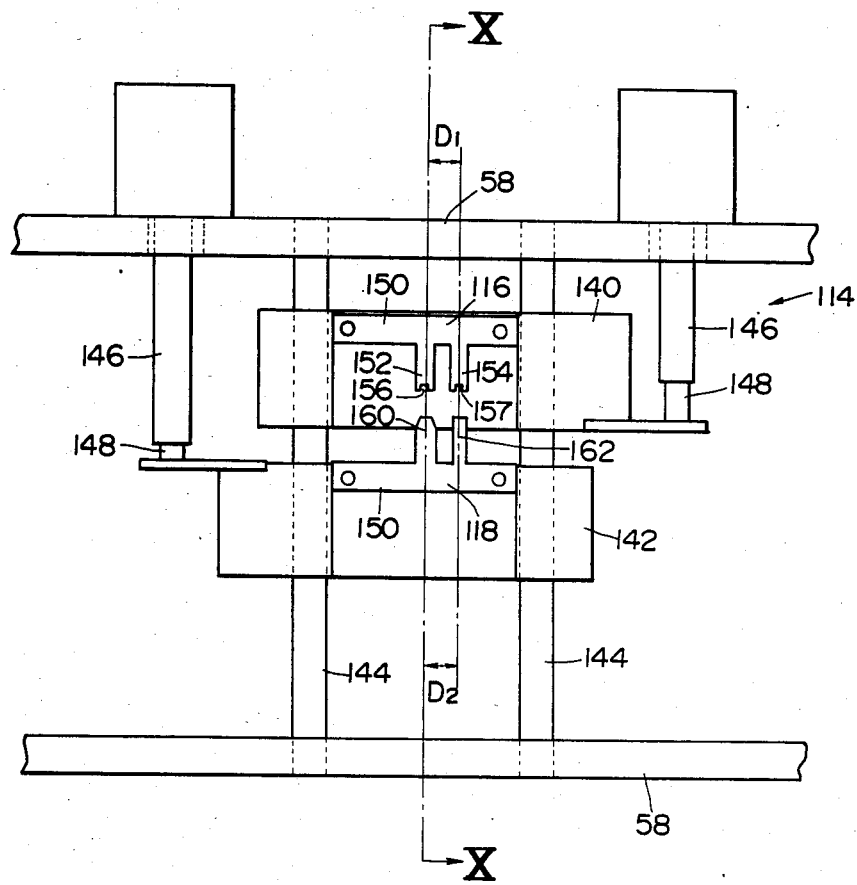
FIG. 9 is an enlarged plan view of the positioning device of apparatus in FIG. 7 with other devices are removed.

As clearly illustrated in FIGS. 9 and 10, the positioning device 114 includes first and second sliders 140 and 142 slidably mounted around a pair of parallel guide rods 144 and 144 which are attached at their opposite ends to the frame 58 to pass perpendicularly under the feeding belt conveyor 44. The first and second sliders 140 and 142 are attached to rods 148 of respective air cylinders 146 mounted to the frame 58 for moving along the guide rods 144. The first and second positioning members 116 and 118 have a generally $\pi$-shape and are made of a metal plate. Horizontal portions 150 and 150 of the first and second positioning members 116 and 118 are fastened with screws to the upper faces of the first and second sliders 140 and 142, respectively. The first positioning member 116 has first and second parallel legs 152 and 154 formed integrally with its horizontal portion 150 to project perpendicularly from the latter. The two legs 152 and 154 have recesses 156 and 157 formed in their distal ends respectively to loosely fit a projection 158 of work W in them. The second positioning member 118 has also first and second parallel legs 160 and 162 which project perpendicularly from its horizontal portion 150 so that their distal ends face the distal ends of the first and second legs 152 and 154 of the first positioning member 116, respectively. The distal end of the first leg 160 has a trapezoidal shape tapering toward its end and the second leg 162 is rectangular in plan view. The first legs 152 and 160 are equal in width to works W and the second legs 154 and 162 are slightly smaller in width than works W. The distance D1 between the centers of the legs 152 and 154 and the distance D2 between the centers of the legs 160 and 162 are equal to the pitch $P_2$ of the attitude controlling grooves 87.

A groove detecting device 164 is provided to the frame 58 for detecting an attitude controlling groove 87 of a jig 67, in which groove a work W to be moved to a suction position is received. The groove detecting device 164 includes a conventional light emitting element 166 disposed behind the first positioning member 116 and a conventional light receiving element 168 disposed in front of the second positioning member 118. The light receiving element 168 normally receives light from the light emitting element 166 and when the light is intercepted by one of the ridges 98 of jig 98, the light receiving element 168 produces an electric signal, which is provided to the control unit 134, which in turn deenergizes the electric motor 170 of the feeding belt conveyor 40 to stop the latter. The light from the light emitting element 166 passes through holes 172 and 172 formed through the sliders 140 and 142, holes 174 and 174 formed through guide plates 66 and 66 of the feeding belt conveyor 40.

Figure 12:
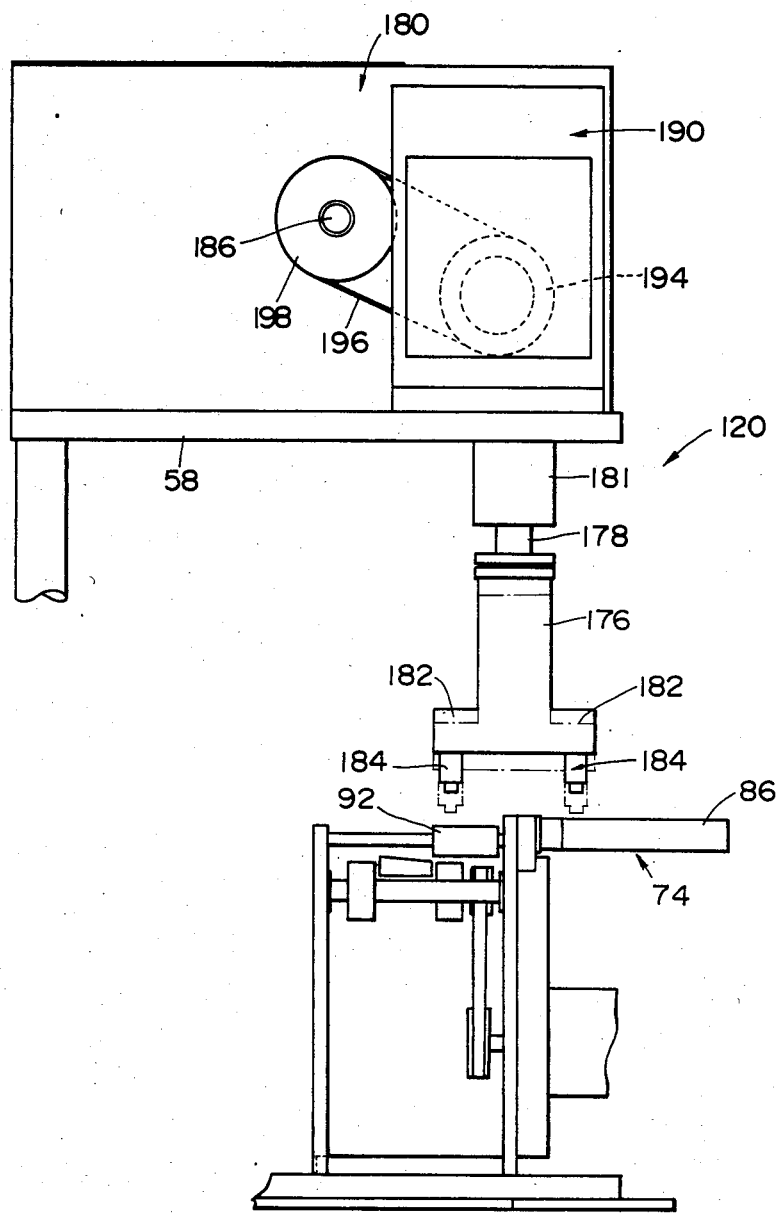
FIG. 12 is an enlarged front view of the second handling device in FIG. 1.
Figure 13:
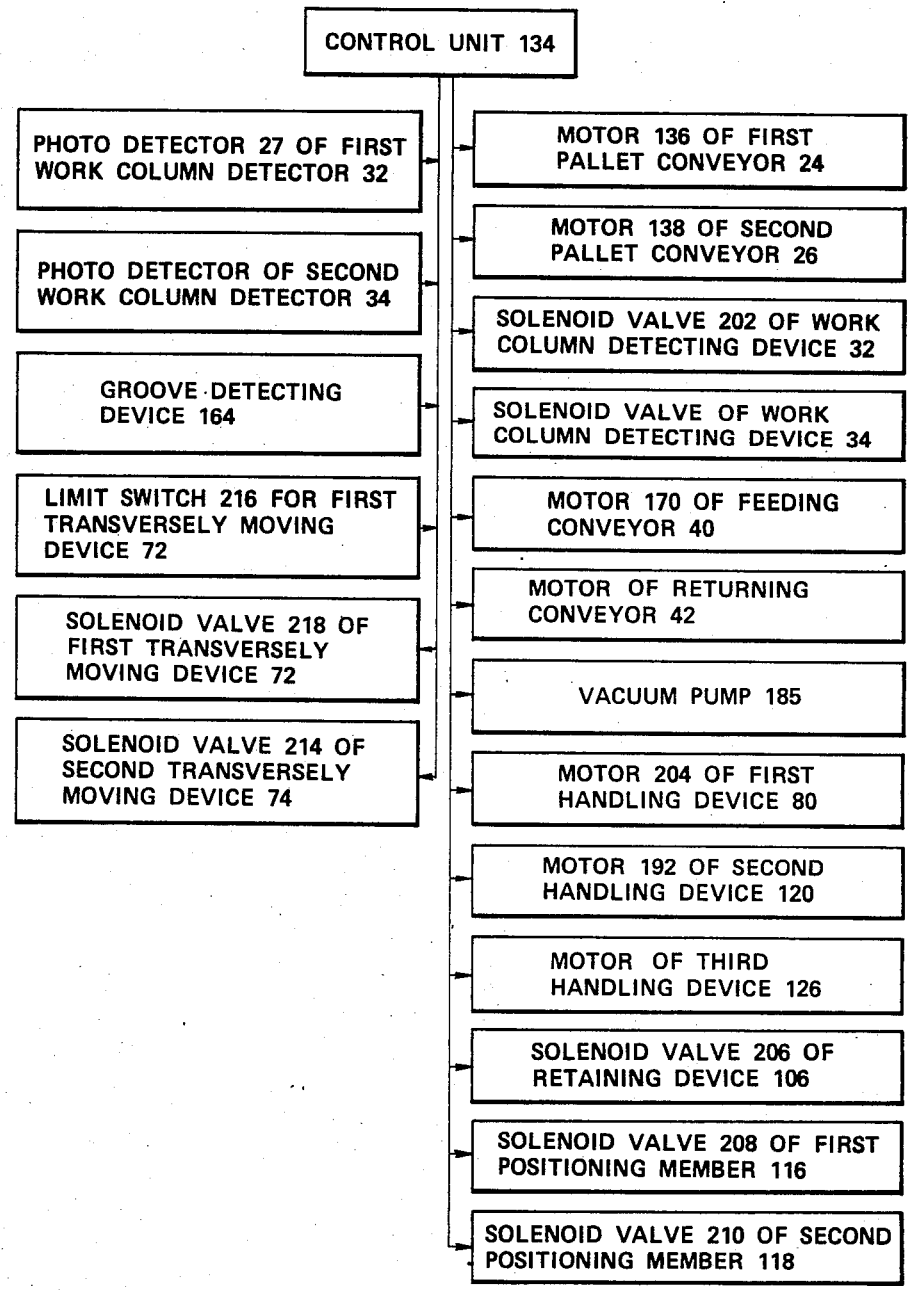
FIG. 13 is a block diagram illustrating electric controlling elements of the work feeding apparatus in FIG. 1.

The second handling device 120 includes a center shaft 176 concentrically mounted around an output shaft 178 of a conventional barrel cam mechanism 180. The output shaft 178 passes through a support sleeve 181 mounted on the frame 58 and is supported on it to be both rotatable about a vertical axis and vertically slidable. The center shaft 176 has a pair of arms 182 and 182 projecting radially outwards in the opposite directions. Each arm 182 has a conventional vacuum head 184 and 184 attached to the lower face of its free end, the vacuum head 184 being communicated through an evacuating passage (not shown) which is formed through the arms 182 and the center shaft 176, to a conventional vacuum unit (not shown) including a vacuum pump 185 (FIG. 13). For turning and vertically moving the output shaft 178, an input shaft 186 of the barrel cam mechanism 180 is connected to an output shaft 188 of a drive unit 190, including an electric motor 192 (FIG. 13), through a drive timing belt pulley 194, a timing belt 196 and a driven timing belt pulley 198. With such a construction, the center shaft is forced to both turn about the vertical axis and move vertically from a waiting position shown by the solid line to a suction position shown by the phantom line in FIG. 12 when the drive unit 190 is actuated.

In operation, pallets 22, in the recesses 30 of which works W are received in columns and rows, are stacked in the pallet magazine 20 and then pallets 22 are subsequently conveyed from the bottom of the pallet magazine 20 by actuating the first pallet conveyor 24. When the leading or the first column of works W in a first pallet 22A reaches to a work column detection position just below the detecting arm 36 of the first work column detecting device 32 shown by the phantom line in FIG. 1, a work detection signal is provided from the photo detector 27 (FIG. 13) of the first work column detecting device to the control unit 134, which according to this signal deenergizes the electric motor 136 of the first pallet conveyor 24, thus stopping the first pallet 22A in position. Then, the control unit 134 actuates a solenoid vale 202 of the air cylinder 130 of the first work column detecting device 32 to move the detecting rod 36 to a position show by the solid line in FIG. 1, after which the control, uhit 134 energizes an electric motor 204 of the first handling device 80, of which handling arm 84 is this raised from the jig position, indicated by the phantom line, turned 90° and then descended to a pallet position indicated by the solid line in FIG. 1. When the handling arm 84 reaches to the pallet position, the front column of works W at the sucking position are sucked by suction heads of the handling arm 84. Then, the control unit 134 energizes the electric motor 204 to rotate in the reverse direction for returning the handling arm 84 back to the jig position. Thus, it is raised, turned 90° and then descended an when it reaches to the jig position, the suction heads insert each work W into a corresponding attitude control groove 87 of a first jig 67A which is located at the starting position 40A of the feeding conveyor 40, where the work W is guided by inclined walls 104 of the groove 87 into the bottom portion 100 to assume a predetermined attitude. At the same time, the control unit 134 deenerizes the electric motor 204 for stopping the handling arm 84.

After the supplying of works W to respective attitude controlling grooves 87 of the first jig 67A, the control unit 134 actuates a solenoid valve 206 of the retaining device 106 for retracting the rod 110 of the air cylinder 108, so that the jig 67A supplied with works W is conveyed toward the positioning device 114. When the groove detector 164 detects that a work W, received in the leading attitude control groove 87, reaches to the handling position, it provides a work detection signal to the control unit 134, which in turn deenergizes the electric motor 170 of the feeding conveyor 40 for stopping the leading work W at the handling position. Then, the control unit 134 actuates solenoid valves 208, 210 of the air cylinders 146 of the first and second positioning member 116 and 118, thus moving the first and second sliders 140, 142 toward each other for clamping the leading work W between legs 152 and 160, in which event the work W which is located out of the suction position 212 (FIG. 4) in the leading attitude control groove 87 is moved exactly to the suction position 212.

After this, the control unit 134 deactivates the solenoid valve 208 of the first air cylinder 146 and the first slider 140 is thus returned back to the original position by retracting the rod 148 of the first air cylinder 146. Then, the control unit 134 actuates the electric motor 192 of the barrel cam mechanism 180 and the vacuum pump 185 of the vacuum unit, thus lowering the handling- arms 182, at the waiting position shown by the solid line in FIG. 12, to suck the work W at the suction position shown by the phantom line by the vacuum head 184 of its one arm 182 and a work W, already processed and held by one of chucks 200 of the rotary table 122, by the vacuum head 184 of the other hand and then lifting the handling arms 182. Thereafter, the second positioning member 118 of the positioning device 114 is retracted to the original position and the handling arms 182 are rotated 180° and then lowered for passing the work W, held by the vacuum head 184 of the one arm 182, to the one chuck 200 and for inserting the work procesed W, sucked by the vacuum head of the other arm 182, into the leading attitude controlling groove 87. Then, the handling arms 182 are raised to the waiting position.

After this operation, the control unit 134 energizes the electric motor 170 of the feeding conveyor 40, thus forwarding the jig 67A at the handling position a distance of one pitch of the attitude controlling grooves 87. When the subsequent ridge 98 of the jig 67A intercepts light from the light emitting element 166, the groove detector 164 provides again a work detection signal to the control unit 134, which similarly controls exchange of subsequent works W, processed and to be processed, between the first jig 67A and the rotary table 122. When the second groove 87 of the jig 67A is stopped at the handling position, legs 154 and 162 of the positioning members 116 and 118 locate the work W, which has been processed and then inserted in the leading groove, at an appropriate position while a subsequent work W placed in the second groove 87 is positioned at the suction position 212. By repeating operations above stated ten unprocessed works W in the attitude control grooves 87 are replaced by ten works W processed and the jig 67 is then conveyed to the terminal portion 40B of the feeding conveyor 40, where it is stopped by the second transversely moving device 74.

During the operations above stated the following operations are simultneously made. A second jig 67B is transported by the first transversely moving device 72 from the terminal portion 42B of the returning conveyor 42 to the start portion 40A of the feeding conveyor 40 and the detecting rod 36 of the first work column detecting device 32 is returned to the work column detection position, where it detects the subsequent second column of works W, thus stopping the pallet 22 in the same manner as above described. Then, the second column of works are transferred by the first handling device 80 from the second pallet 22 to the second jig 67B as in the first jig 67A. The second jig 67B with the ten works W is conveyed from the starting portion 40A of the feeding conveyor 40 to the handling position simultaneously with the conveying of the first jig 67A from the handling position to the terminal portion 40B of the feeding conveyor 40.

When the first jig 67A is brought into abutment against the stopping block 92 of the second transversely moving device 74 and is thus stopped at the terminal portion 40B, a limit switch (not shown) disposed near the terminal portion 40B is actuated by the first jig 67A, thus providing an electric signal to the control unit 134, which in turn energizes the electric motor of the third handling device 126, which thus transfers the processed works W on the first jig 67A to a second empty pallet 22B in a manner similar to the first handling device 80 but in this case the operation of the third handling device 126 is operated in the reverse order. Specifically, the holding arm 84 of the third handling device 126 is lowered from the position shown by the phantom line in FIG. 1 to hold the ten processed works W by its vacuum head. Then, the holding arm 84 is raised and then rotated 90° to the position shown by the solid line, where it is lowered to insert the processed works into respective recesses 30 of the second pallet 22B. During this event, the second pallet 22B is stopped at the loading position, shown by the phantom line in FIG. 1, by the second detecting device 34. After these operation, the third handling device 126 is returned to the original position.

After the processed works W are removed from the first jig 67A, the control unit 134 actuates a solenoid valve 214 of the air cylinder 86 of the second transversely moving device 74 for moving the empty first jig 67A to the returning conveyor 42 by the pulling plate 94, which is then retracted to the position shown by the solid line in FIG. 7. The first jig 67A placed on the returning conveyor 42 is conveyed from the start portion 42A to the terminal portion 42B of the returning conveyor 42, where the first jig 67A is stopped by the stopping block 92 of the first transversely moving device 72. This is detected by a limit switch 216 disposed near the terminal portion 42B of the returning conveyor 42 and according to the detection signal from the limit switch 216, the control unit 134 actuates the solenoid valve 218 of the first transversely moing device 72 for retracting the rod 90 of the air cylinder 86 thereof to move the first jig 67A to the start portion 40A of the feeding cnveyor 40. Then, the control unit 134 deactivates the solenoid valve 218 for projecting the rod 90 of the air cylinder 86 to thereby return the stopping and moving member 88 to the original position shown by the solid line in FIG. 7. When the second pallet 22B is fully filled with works processed, the control unit 134 actuates the electric motor 138 of the second belt conveyor 26 and the second pallet 22B is thus conveyed to the second pallet magazine 28 where it is stored. By repeating operations above described, all the works W on the pallets 22 which are stacked in the first pallet magazine 20 are processed and then sent with the pallets 22 to the second pallet magazine 28.

In the holding arms 182 and 182, works W may be held by an electromagnet or a conventional mechanical holding means instead of the suction heads 184.

The shape of the attitude controlling grooves 87 depends on the shape of works W to be processed.

Works W which have been processed in the machining device may be transported to other systems without returning to the jig 67 previously receiving them. In this case, the legs 154 and 162 may be omitted.

In place of the first and second transversely moving devices 72 an 74, belt conveyors or othe conventional conveying mechanisms may be used.

What is claimed is:

1. A method of feeding a work, comprising the steps of:
   (a) preparing a jig having an attitude controlling groove formed therein;

(b) controlling a first work to assume a predetermined attitude by placing the work in the attitude controlling groove;
(c) conveying the jig to a first position so that the attiude controlling groove is located at a second position;
(d) then, moing the fist work to a third position in the controlling groove; and
(e) transferring the work at the third position to a machining device.

2. A method as recited in claim 1, further comprising the step of: (e) placing a second work procssed in the machining device, in the attitude controlling groove during the transferring step (d) after the first work is removed from the attitude controlling groove; and (e) moving the second work to a fourth position in the attitude controlling groove.

3. A method as recited in claim 2, wherein the jig has plurality of the attitde controlling grooves formed therin with a pitch in one direction so that the attitude contolling grooves are paralel with each other, the attiude controlling grooves including a leading attitude controlling groove.

4. A method as recited in claim 3, after the second work moving step, further coprising: (f) moving the jig a ditance of the pitch so that an attitude controlling groove, immediately following the leading groove having the processed work received is therein, placed at the second position; and (g) repeating the steps (b) to (f) with respect to other works.

* * * * *